US012230431B2

(12) United States Patent
Park et al.

(10) Patent No.: US 12,230,431 B2
(45) Date of Patent: Feb. 18, 2025

(54) COIL COMPONENT

(71) Applicant: SAMSUNG ELECTRO-MECHANICS CO., LTD., Suwon-si (KR)

(72) Inventors: No Il Park, Suwon-si (KR); Seung Mo Lim, Suwon-si (KR); Tae Jun Choi, Suwon-si (KR); Boum Seock Kim, Suwon-si (KR); Byung Soo Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 955 days.

(21) Appl. No.: 17/167,622

(22) Filed: Feb. 4, 2021

(65) Prior Publication Data

US 2022/0148789 A1 May 12, 2022

(30) Foreign Application Priority Data

Nov. 12, 2020 (KR) ........................ 10-2020-0150604

(51) Int. Cl.
*H01F 27/28* (2006.01)
*H01F 27/32* (2006.01)
(Continued)

(52) U.S. Cl.
CPC ....... *H01F 27/2804* (2013.01); *H01F 27/323* (2013.01); *H01F 41/041* (2013.01);
(Continued)

(58) Field of Classification Search
CPC .... H01F 27/2804; H01F 27/323; H01F 27/29; H01F 2027/2809; H01F 5/04;
(Continued)

(56) References Cited

U.S. PATENT DOCUMENTS 8,810,350 B2 * 8/2014 Seko ..................... H01F 27/292 336/200
2014/0009254 A1 * 1/2014 Ohkubo .............. H01F 17/0033 336/192
(Continued)

FOREIGN PATENT DOCUMENTS

KR 10-1548862 B1 8/2015
KR 10-2015-0134014 A 12/2015
(Continued)

*Primary Examiner* — Mang Tin Bik Lian
(74) *Attorney, Agent, or Firm* — Morgan, Lewis & Bockius LLP

(57) ABSTRACT

A coil component includes a body having a first surface and a first end surface and a second end surface each connected to the first surface and opposing each other, a support substrate disposed in the body, a coil unit including a first coil pattern, a first lead pattern and a second lead pattern respectively disposed on a first surface of the support substrate opposing the first surface of the body, first and second slit portions respectively disposed in edge portions between the first end surface and the second end surface of the body and exposing the first and second lead patterns, and first and second external electrodes arranged in the first and second slit portions and connected to the coil unit, wherein a ratio of a line width of any one of the first and second lead patterns to a line width of any one turn of the first coil pattern satisfies 1 to 1.5.

20 Claims, 11 Drawing Sheets

I-I'

(51) Int. Cl.
*H01F 41/04* (2006.01)
*H01F 41/12* (2006.01)
*H01F 27/29* (2006.01)

(52) U.S. Cl.
CPC ... *H01F 41/122* (2013.01); *H01F 2027/2809* (2013.01); *H01F 27/29* (2013.01)

(58) Field of Classification Search
CPC ........... H01F 17/0013; H01F 2017/048; H01F 27/292; H01F 5/00; H01F 5/02; H01F 5/06; H01F 17/04; H01F 27/006; H01F 27/32; H01F 2017/002; H01F 41/041; H01F 41/122; H01F 1/14725
See application file for complete search history.

(56) References Cited

U.S. PATENT DOCUMENTS

| | | | | |
|---|---|---|---|---|
| 2015/0340149 | A1* | 11/2015 | Lee | H05K 1/111 336/200 |
| 2016/0005528 | A1* | 1/2016 | Yan | H01F 27/292 336/192 |
| 2018/0182537 | A1* | 6/2018 | Shimizu | H01F 27/29 |
| 2019/0088406 | A1* | 3/2019 | Kim | H01F 27/2804 |
| 2019/0096560 | A1* | 3/2019 | Jang | H01F 17/0013 |
| 2020/0118729 | A1 | 4/2020 | Lim et al. | |
| 2022/0102061 | A1* | 3/2022 | Park | H01F 27/323 |

FOREIGN PATENT DOCUMENTS

| | | |
|---|---|---|
| KR | 10-2019-0032896 A | 3/2019 |
| KR | 10-2020-0041696 A | 4/2020 |

* cited by examiner

COIL COMPONENT

CROSS-REFERENCE TO RELATED APPLICATION(S)

This application claims the benefit under 35 USC 119(a) of Korean Patent Application No. 10-2020-0150604 filed on Nov. 12, 2020 in the Korean Intellectual Property Office, the entire disclosure of which is incorporated herein by reference for all purposes.

BACKGROUND

The present inventive concept relates to a coil component.

An inductor, a coil component, is a typical passive electronic component used in electronic devices along with a resistor and a capacitor.

As electronic devices increasingly been implemented with higher performance and have become compact, a larger number of electronic components, reduced in size, are used in electronic devices and electronic components.

External electrodes of a coil component are typically formed on two surfaces of a body opposing each other in a length direction, respectively. In this case, an overall length or width of the coil component may increase due to a thickness of the external electrodes. In addition, when the coil component is mounted on a mounting board, the external electrodes of the coil component may come into contact with other components disposed adjacent to the mounting board, thereby causing an electrical short.

SUMMARY

Example embodiments provide a coil component having improved inductance characteristic.

Example embodiments also provide a coil component in which a lower electrode structure is easily formed.

According to example embodiments, a coil component includes: a body having a first surface and a first end surface and a second end surface each connected to the first surface and opposing each other; a support substrate disposed in the body; a coil unit including a first coil pattern, a first lead pattern and a second lead pattern respectively disposed on the first surface of the support substrate opposing the first surface of the body; first and second slit portions respectively formed in edge portions between the first end surface and the second end surface of the body and exposing the first and second lead patterns; and first and second external electrodes arranged in the first and second slit portions and connected to the coil unit, wherein a ratio of a line width of any one of the first and second lead patterns to a line width of any one turn of the first coil pattern satisfies 1 to 1.5.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
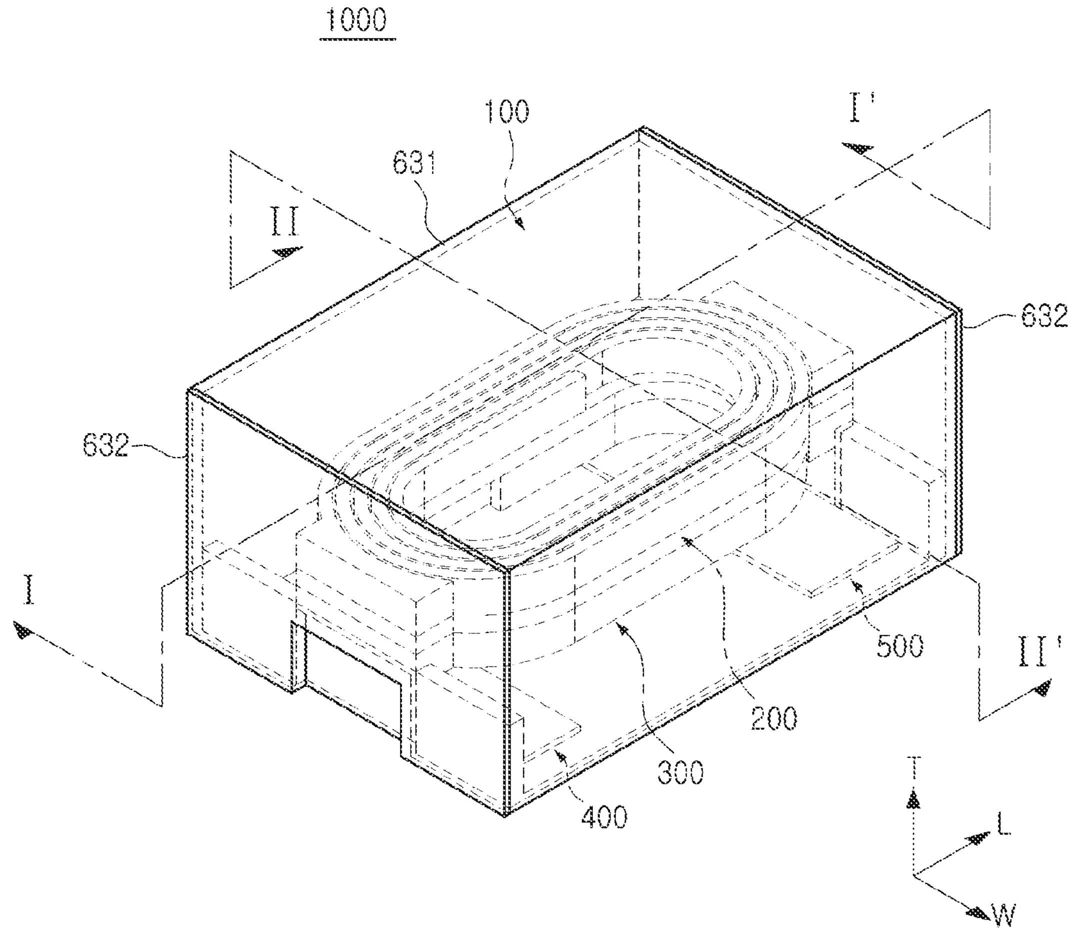
FIG. 1 is a view schematically illustrating a coil component according to an example embodiment of the present inventive concept.

In the drawings, an L direction may be defined as a first direction or a length direction, a W direction may be defined as a second direction or a width direction, and a T direction may be defined as a third direction or a thickness direction.

Hereinafter, a coil component according to an example embodiment of the present inventive concept will be described in detail with reference to the accompanying drawings, and in the description with reference to the accompanying drawings, the same or corresponding components are denoted by the same reference numerals and duplicate descriptions thereof will be omitted.

Various types of electronic components are used in electronic devices, and various types of coil components may be appropriately used between these electronic components to remove noise.

That is, in an electronic device, a coil component may be used as a power inductor, a high frequency (HF) inductor, a general bead, a high frequency bead (GHz bead), a common mode filter, and the like.

Embodiments and Modifications

Figure 2:
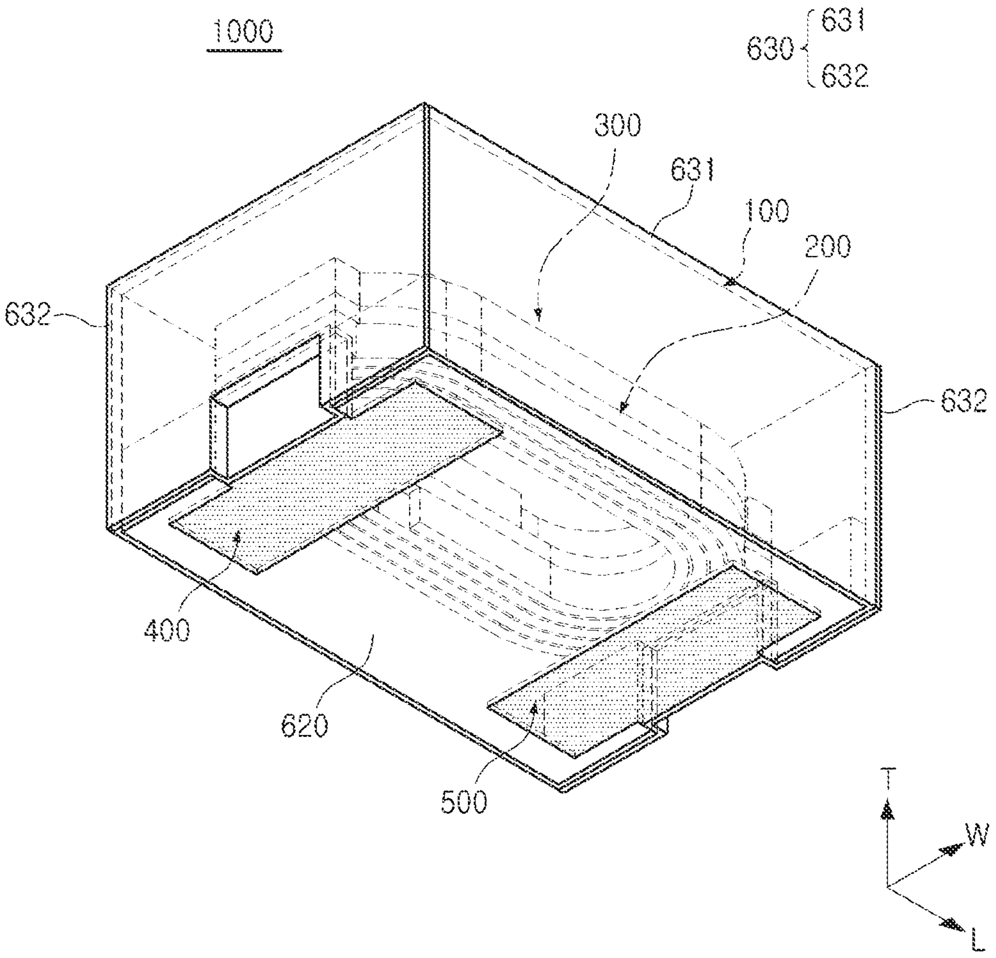
FIG. 2 is a bottom view of a coil component according to an example embodiment of the present inventive concept.
Figure 3:
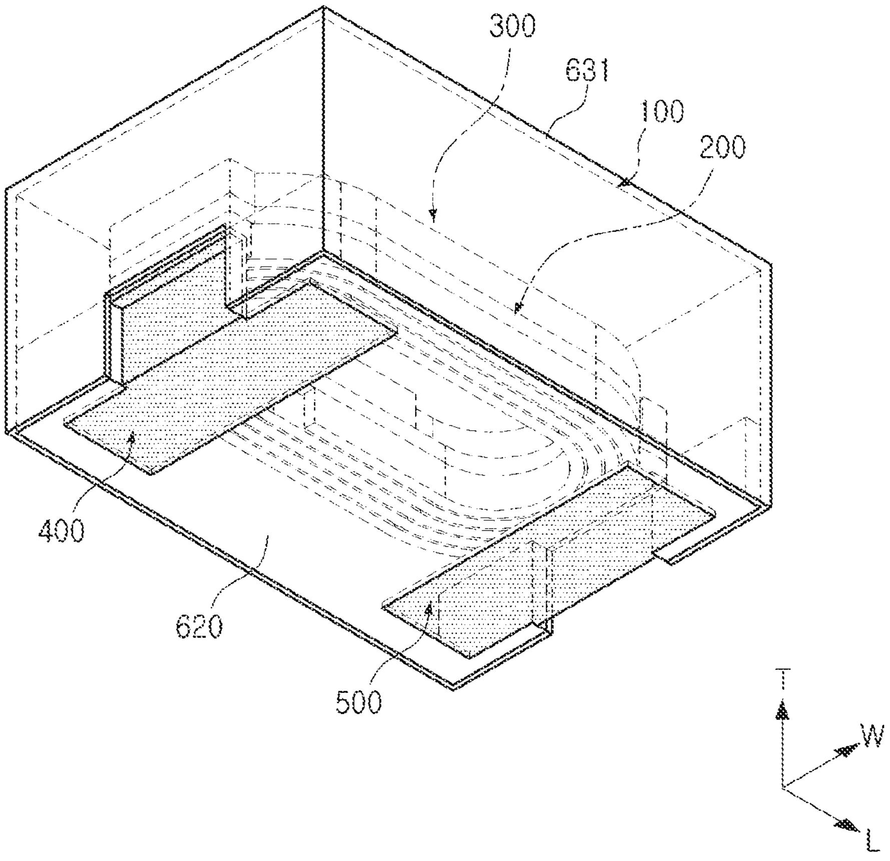
FIG. 3 is a diagram illustrating a state in which a portion of a third insulating layer in FIG. 2 is omitted.
Figure 4:
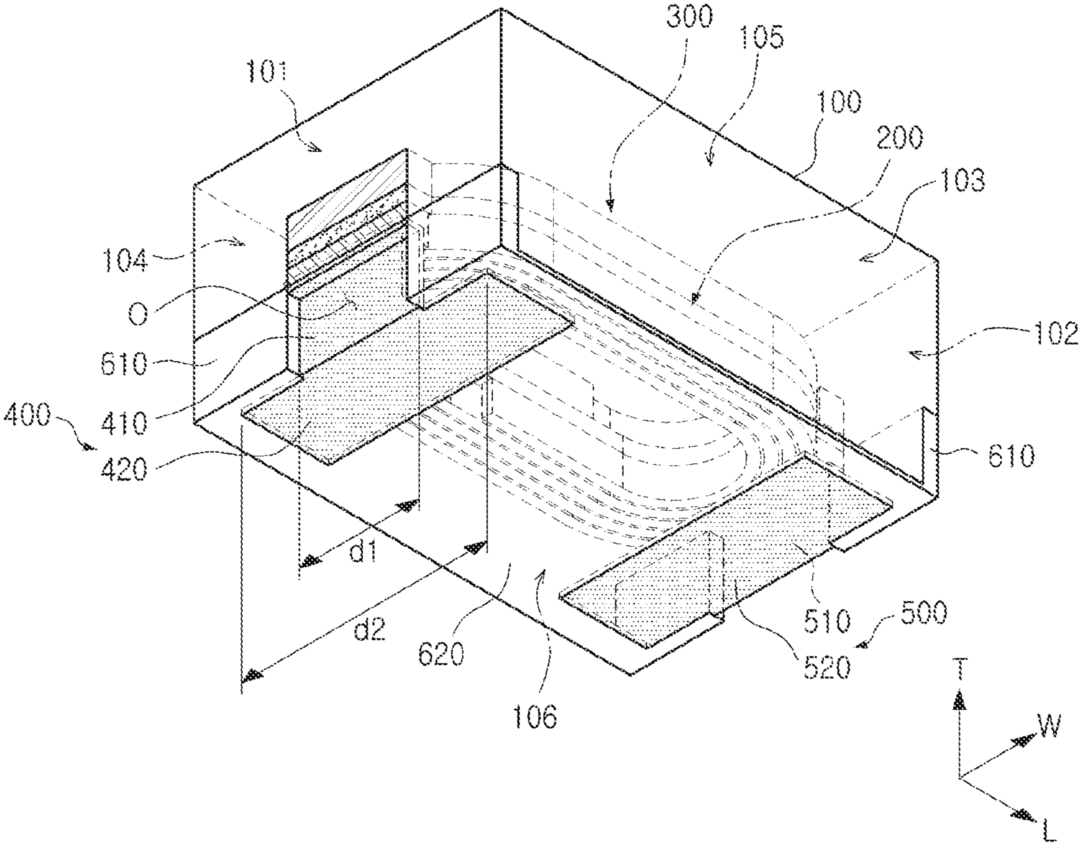
FIG. 4 is a diagram illustrating a state in which the remainder of the third insulating layer in FIG. 3 is omitted.
Figure 5:
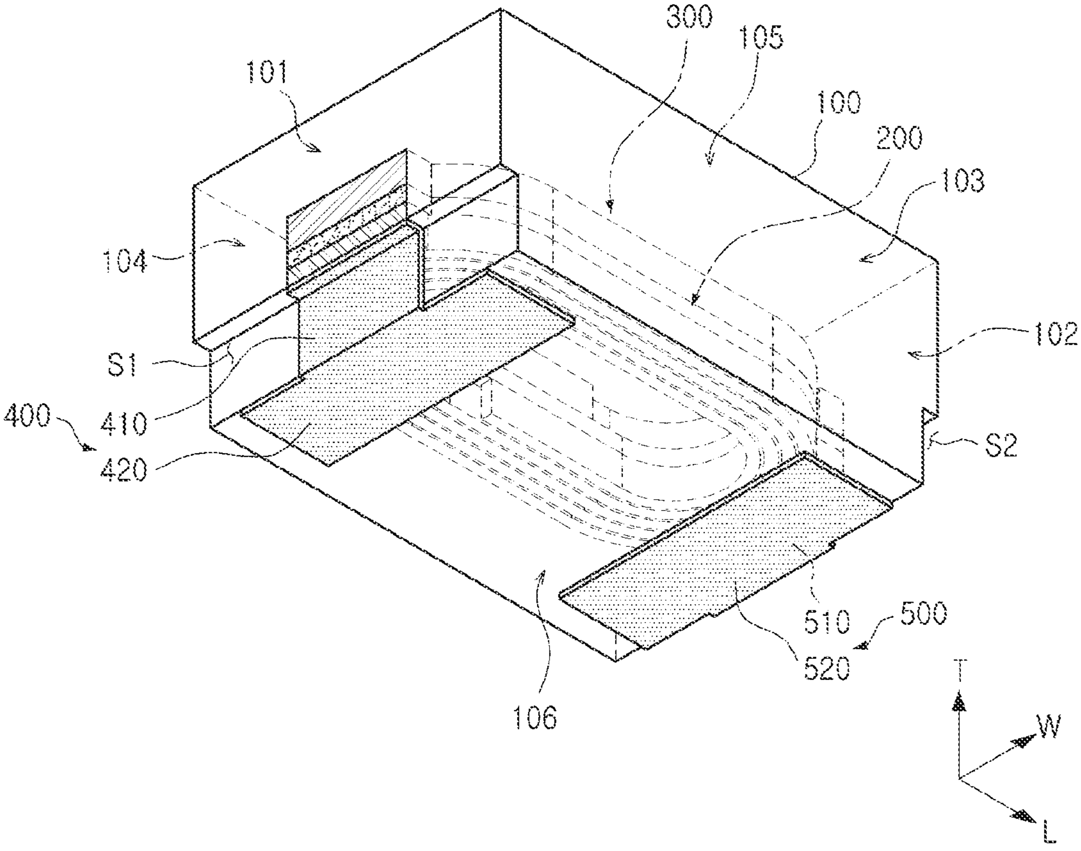
FIG. 5 is a diagram illustrating a state in which first and second insulating layers in FIG. 4 are omitted.
Figure 6:
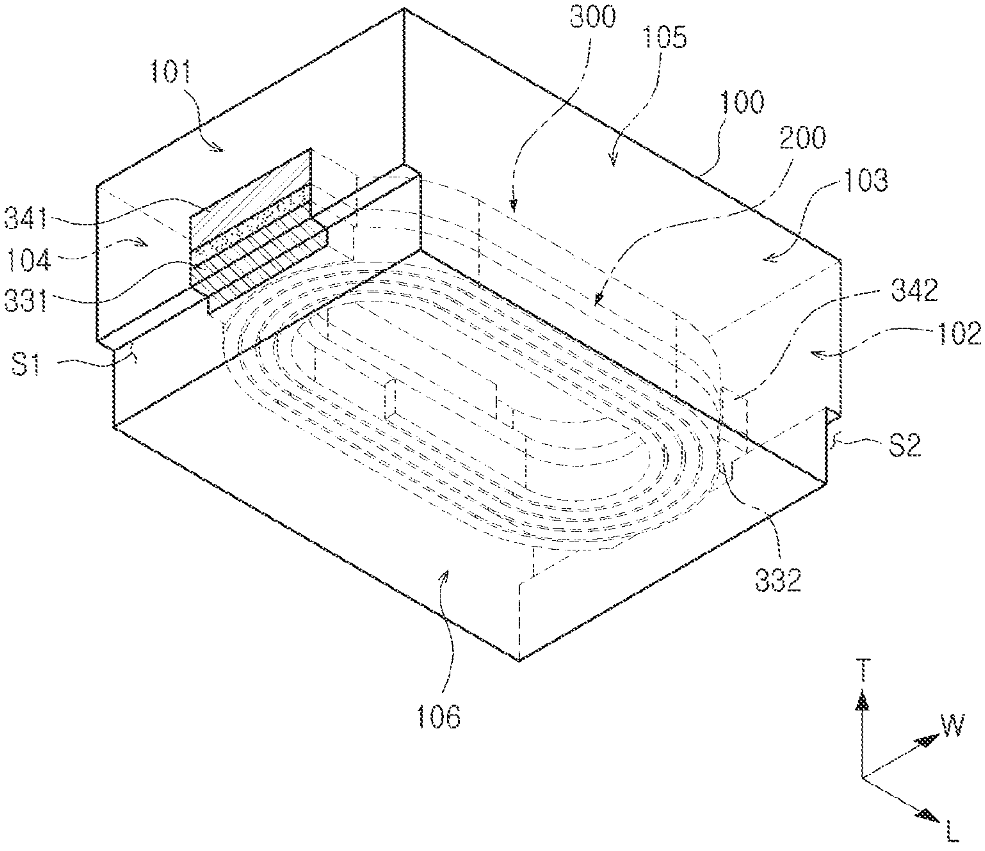
FIG. 6 is a view illustrating a state in which an external electrode in FIG. 5 is omitted.
Figure 7:
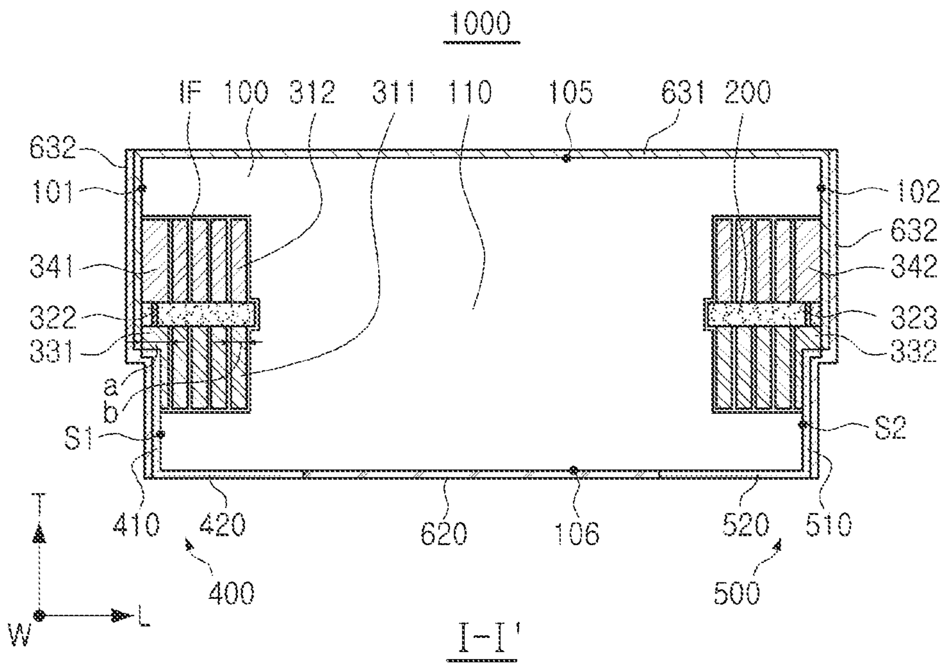
FIG. 7 is a cross-sectional view taken along line I-I' of FIG. 1.
Figure 8:
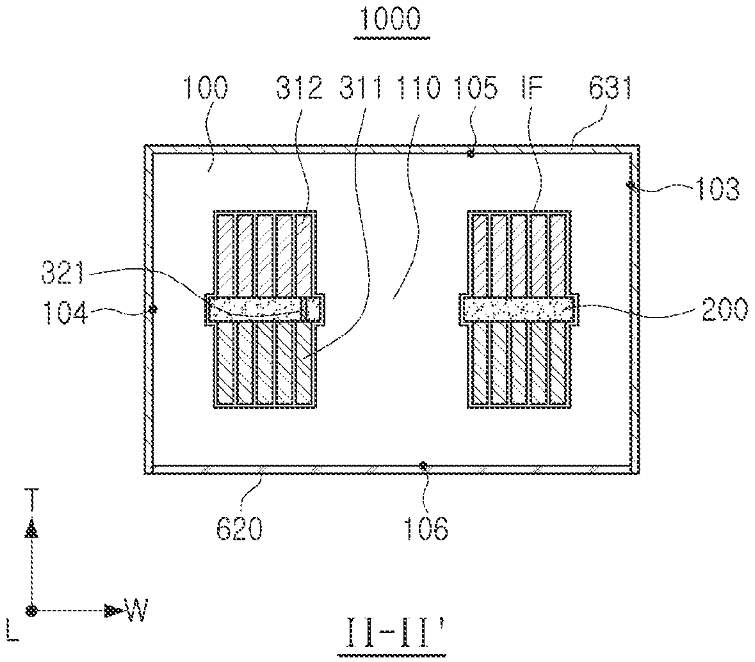
FIG. 8 is a cross-sectional view taken along line II-II' of FIG. 1.
Figure 9:
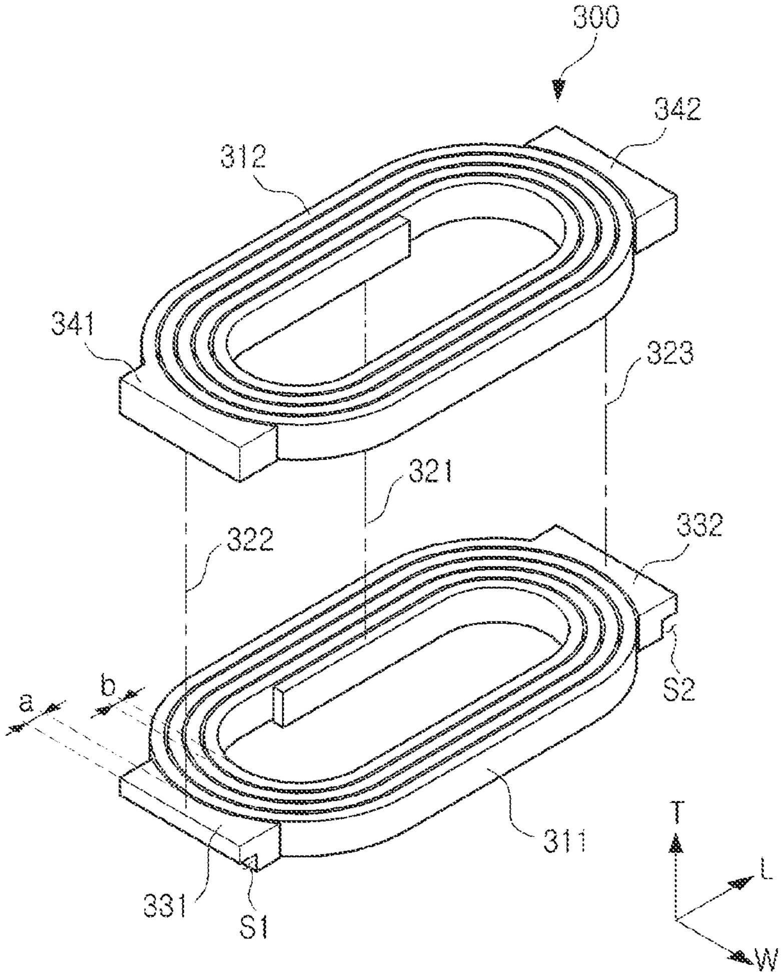
FIG. 9 is an exploded view of a coil unit of FIG. 1.

FIG. 1 is a view schematically illustrating a coil component according to an example embodiment of the present inventive concept. FIG. 2 is a bottom view of a coil component according to an example embodiment of the present inventive concept. FIG. 3 is a diagram illustrating a state in which a portion of a third insulating layer in FIG. 2 is omitted. FIG. 4 is a diagram illustrating a state in which the remainder of the third insulating layer in FIG. 3 is omitted. FIG. 5 is a diagram illustrating a state in which first and second insulating layers in FIG. 4 are omitted. FIG. 6 is a view illustrating a state in which an external electrode in FIG. 5 is omitted. FIG. 7 is a cross-sectional view taken along line I-I' of FIG. 1. FIG. 8 is a cross-sectional view taken along line II-II' of FIG. 1. FIG. 9 is an exploded view of a coil unit of FIG. 1.

Referring to FIGS. 1 to 9, a coil component 1000 according to an example embodiment of the present inventive concept may include a body 100, a support substrate 200, a coil unit 300, external electrodes 400 and 500, and insulating layers 610, 620, and 630, and may further include an insulating film IF (see FIG. 7).

The body 100 forms the exterior of the coil component 1000 according to the present example embodiment, and the coil unit 300 and the support substrate 200 are disposed therein.

The body 100 may have a hexahedral shape as a whole. In FIGS. 5 and 6, the body 100 includes a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 corresponds to a wall surface of the body 100 that connects the fifth surface 105 and the sixth surface 106 of the body 100. Hereinafter, both end surfaces (first end surface and second end surface) of the body 100 may refer to the first surface 101 and the second surface 102 of the body, and both side surfaces (first side surface and second side surface) of the body 100 may refer to the third surface 103 and the fourth surface 104 of the body, and one surface of the body 100 may refer to the sixth surface 106 of the body 100 and the other surface of the body 100 may refer to the fifth surface 105 of the body 100.

By way of example, the body 100 may be formed such that the coil component 1000 according to the present example embodiment including external electrodes 400 and 500 and insulating layers 610, 620, and 630 to be described later has a length of 2.0 mm, a width of 1.2 mm, and a thickness of 0.65 mm but is not limited thereto. Meanwhile, the aforementioned dimensions are merely design values that do not reflect process errors, etc., and thus, it should be appreciated that dimensions within a range admitted as a process error fall within the scope of the present inventive concept.

Based on an optical microscope or a scanning electron microscope (SEM) image for a length directional (L)-thickness directional (T) cross-section at a width-directional (W) central portion of the coil component 1000, the length of the coil component 1000 may refer to a maximum value among lengths of a plurality of segments parallel to the length direction L when outermost boundary lines of the coil component 1000 illustrated in the image of the cross-section are connected. Alternatively, the length of the coil component 1000 described above may refer to an arithmetic mean value of at least three of the plurality of segments parallel in the length direction L when the outermost boundary lines of the coil component 1000 illustrated in the cross-sectional image are connected.

Based on the optical microscope or SEM image for the length directional (L)-thickness directional (T) cross-section at the width-directional (W) central portion of the coil component 1000, the thickness of the coil component 1000 may refer to a maximum value among lengths of a plurality of segments parallel to the thickness direction T when outermost boundary lines of the coil component 1000 illustrated in the image of the cross-section are connected. Alternatively, the thickness of the coil component 1000 described above may refer to an arithmetic mean value of at least three of the plurality of segments parallel in the thickness direction T when the outermost boundary lines of the coil component 1000 illustrated in the cross-sectional image are connected.

Based on an optical microscope or SEM image for a width directional (W)—thickness directional (T) cross-section at a length-directional (L)—central portion of the coil component 1000, the width of the coil component 1000 may refer to a maximum value among lengths of a plurality of segments parallel to the width direction W when outermost boundary lines of the coil component 1000 illustrated in the image of the cross-section are connected. Alternatively, the width of the coil component 1000 described above may refer to an arithmetic mean value of at least three of the plurality of segments parallel in the width direction W when the outermost boundary lines of the coil component 1000 illustrated in the cross-sectional image are connected.

Alternatively, each of the length, width, and thickness of the coil component 1000 may be measured by a micrometer measurement method. With the micrometer measurement method, ach of the length, width, and thickness of the coil component 1000 may be measured by setting a zero point with a gage repeatability and reproducibility (R&R) micrometer, inserting the coil component 1000 according to the present example embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 may include a magnetic material and a resin. Specifically, the body 100 may be formed by stacking at least one magnetic composite sheet in which a magnetic material is dispersed in a resin. However, the body 100 may have a structure other than the structure in which a magnetic material is dispersed in a resin. For example, the body 100 may be formed of a magnetic material such as ferrite.

The magnetic material may be ferrite or metal magnetic powder.

Ferrite may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

Magnetic metal powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

The magnetic metal powder may be amorphous or crystalline. For example, the magnetic metal powder may be Fe—Si—B—Cr-based amorphous alloy powder, but is not limited thereto.

Ferrite and the magnetic metal powder may each have an average diameter of about 0.1 μm to 30 μm, but are not limited thereto. Meanwhile, the average diameter of the magnetic metal powder may refer to a particle size distribution of particles represented by D50 or D90.

The body 100 may include two or more types of magnetic materials dispersed in a resin. Here, the different types of magnetic materials refer to that magnetic materials dispersed in a resin are distinguished from each other by any one of an average diameter, a composition, crystallinity, and a shape.

The resin may include, but is not limited to, epoxy, polyimide, liquid crystal polymer, or the like alone or as a mixture.

The body 100 includes a core 110 penetrating a central portion of each of the support substrate 200 and the coil unit 300 to be described later. The core 110 may be formed by filling a through hole through penetrating the central portion of each of the coil unit 300 and the support substrate 200 by the magnetic composite sheet, but is not limited thereto.

The first and second slit portions S1 and S2 are formed in edge portions between each of the first and second surfaces 101 and 102 of the body 100 and the sixth surface 106 of the body 100. Specifically, the first slit portion S1 is formed at the edge portion between the first surface 101 of the body 100 and the sixth surface 106 of the body 100, and the second slit portion S2 is formed at the edge portion between the second surface 102 of the body 100 and the sixth surface 106 of the body 100. Meanwhile, the first and second slit portions S1 and S2 may have a depth by which lead patterns 331 and 332 to be described later are exposed to inner surfaces of the first and second slit portions S1 and S2 (dimension of the first slit and second slit portions based on the thickness direction T), but do not extend to the fifth surface 105 of the body 100. That is, the first and second slit portions S1 and S2 do not penetrate the body 100 in the thickness direction T.

The first and second slit portions S1 and S2 extend to the third and fourth surfaces 103 and 104 of the body 100 in the width direction W of the body 100, respectively. That is, the first and second slit portions S1 and S2 may have a shape of a slit formed along the entire width direction W of the body 100. The first and second slit portions S1 and S2 may be formed by performing pre-dicing on one surface of a coil bar along boundaries corresponding to the width direction of each coil component, among boundary lines that individualize each coil component at a coil bar level before each coil component is individualized. A depth during pre-dicing is adjusted so that the lead patterns 331 and 332 are exposed.

Meanwhile, inner surfaces (inner walls and bottom surfaces) of the slit portions S1 and S2 also configure the surface of the body 100, but in the present disclosure, for convenience of description, the inner surfaces of the slit portions S1 and S2 are distinguished from the surface of the body 100. In addition, in FIGS. 1 to 9, it is illustrated that the first and second slit portions S1 and S2 have inner walls parallel to the first and second surfaces 101 and 102 of the body 100 and bottom surfaces parallel to the fifth and sixth surfaces 105 and 106 of the body 100, but this is for convenience of description and the scope of the present example embodiment is not limited thereto. As an example, the first slit portion S1 may have an inner surface having a curved shape connecting the first surface 101 and the sixth surface 106 of the body 100 with respect to the length directional (L)-thickness directional (T) cross-section (LT cross-section) of the coil component 1000 according to the present example embodiment. However, hereinafter, for convenience of description, it will be described that the slit portions S1 and S2 have inner walls and bottom surfaces.

The support substrate 200 is embedded in the body 100. The support substrate 200 is configured to support the coil unit 300 to be described later.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of insulating materials such as prepreg, Ajinomoto build-up film (ABF), FR-4, a bismaleimide triazine (BT) resin, photo imagable dielectric (PID), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. If the support substrate 200 is formed of an insulating material that does not contain glass fibers, the support substrate 20 is advantageous in reducing the thickness of the coil component 1000 according to the present example embodiment. In addition, a volume occupied by the coil unit 300 and/or the magnetic material may be increased based on the body 100 having the same size, thereby improving component characteristics. When the support substrate 200 is formed of an insulating material including a photosensitive insulating resin, the number of processes for forming the coil unit 300 may be reduced, which is advantageous in reducing production costs and forming fine vias.

The coil unit 300 is disposed inside the body 100 to manifest the characteristics of the coil component. For example, when the coil component 1000 of the present example embodiment is used as a power inductor, the coil unit 300 may serve to stabilize power of an electronic device by storing an electric field as a magnetic field and maintaining an output voltage.

The coil unit 300 includes coil patterns 311 and 312, vias 321, 322 and 323, lead patterns 331 and 332, and dummy lead patterns 341 and 342. Specifically, with respect to the direction of FIGS. 1, 7, 8, and 9, the first coil pattern 311, the first lead pattern 331, and the second lead pattern 332 are arranged on a lower surface of the support substrate 200 opposing the sixth surface 106 of the body 100, and the second coil pattern 312, the first dummy lead pattern 341, and the second dummy lead pattern 342 are arranged on an upper surface of the support substrate 200 opposing a lower surface of the support substrate 200. On the lower surface of the support substrate 200, the first coil pattern 311 is spaced apart from the first lead pattern 331 and in contact with and connected to the second lead pattern 332. On the upper surface of the support substrate 200, the second coil pattern 312 is in contact with and connected to the first dummy lead pattern 342 and spaced apart from the second dummy lead pattern 342. The first via 321 is in contact with and connected to an inner end of each of the first coil pattern 311 and the second coil pattern 312 through the support substrate 200. The second via 322 is in contact with and connected to the first lead pattern 331 and the first dummy lead pattern 341 through the support substrate 200. The third via 323 is in contact with and connected to the second lead pattern 332 and the second dummy lead pattern 342 through the support substrate 200. Accordingly, the coil unit 300 may function as a single coil as a whole.

Each of the first coil pattern 311 and the second coil pattern 312 may have a shape of a flat spiral in which at least one turn is formed around the core 110. For example, the first coil pattern 311 may form at least one turn around the core 110 on the lower surface of the support substrate 200.

The first lead pattern 331 and the second lead pattern 332 are exposed to the first and second slit portions S1 and S2. Specifically, the first lead pattern 331 is exposed to an inner surface of the first slit portion S1, and the second lead pattern 332 is exposed to an inner surface of the second slit portion S2. Since the connection portions 410 and 510 of the external electrodes 400 and 500 to be described later are disposed in the first and second slit portions S1 and S2, the coil unit 300 and the external electrodes 400 and 500 are in contact with and connected to each other. Meanwhile, hereinafter, for convenience of description, as shown in FIGS. 5 to 7 and 9, a case in which the first and second slit portions S1 and S2 extend to an inner side of at least a portion of each of the lead patterns 331 and 332 so that the lead patterns are exposed to an inner wall and a bottom surface of the first and second slit portions S1 and S2 is provided as an example, but this is only exemplary and the scope of this example embodiment is not limited thereto. That is, the depth of the first and second slit portions S1 and S2 may be adjusted so that the lead patterns 331 and 332 are only exposed to the bottom surfaces of the first and second slit portions S1 and S2. Meanwhile, when the lead patterns 331 and 332 are exposed to both the bottom surfaces and inner walls of the first and second slit portions S1 and S2, contact areas between the connection portions 410 and 510 of the lead patterns 331 and 332 and the external electrodes 400 and 500 may increase to increase coupling force between the coil unit 300 and the external electrodes 400 and 500.

First surfaces of the lead patterns 331 and 332 exposed respectively to the inner surfaces of the first and second slit portions S1 and S2 may have higher surface roughness than the other surfaces of the lead patterns 331 and 332. For example, in the case of forming the first and second slit portions S1 and S2 after the lead patterns 331 and 332 are formed by electroplating, some of the lead patterns 331 and 332 may be removed in a slit portion forming process. Accordingly, the first surfaces of the lead patterns 331 and 332 exposed to the inner surfaces of the first and second slit portions S1 and S2 may have high surface roughness, compared with the other surfaces of the lead patterns 331 and 332 due to polishing of a dicing tip. As described later, the external electrodes 400 and 500 are formed as thin films so coupling force thereof with the coil unit 300 may be relatively weak. However, since the external electrodes 400 and 500 are in contact with and connected to the first surfaces of the lead patterns 331 and 332 having relatively high surface roughness, coupling force between the external electrodes 400 and 500 and the lead patterns 331 and 332 may be improved.

The lead patterns 331 and 332 and the dummy lead patterns 341 and 342 are exposed to the first and second surfaces 101 and 102 of the body 100, respectively. That is, the first lead pattern 331 is exposed to the first surface 101 of the body 100, and the second lead pattern 332 is exposed to the second surface 102 of the body 100. The first dummy lead pattern 341 is exposed to the first surface 101 of the body 100, and the second dummy lead pattern 342 is exposed to the second surface 102 of the body 100. Accordingly, as shown in FIG. 6, the first lead pattern 331 is continuously exposed to the inner wall of the first slit portion S1, the bottom surface of the first slit portion S1, and the first surface 101 of the body 100, and the second lead pattern 332 is continuously exposed to the inner wall of the second slit portion S2, the bottom surface of the second slit portion S2, and the second surface 102 of the body 100.

At least one of the coil patterns 311 and 312, the vias 321, 322, and 323, the lead patterns 331 and 332, and the dummy lead patterns 341 and 342 may include at least one conductive layer.

As an example, when the second coil pattern 312, the dummy lead patterns 341 and 342, and the vias 321, 322, and 323 are formed by plating on the upper surface side of the support substrate 200, the second coil pattern 312, the dummy lead patterns 341 and 342, and the vias 321, 322, and 323 may each include a seed layer and an electroplating layer. Here, the electroplating layer may have a single layer structure or a multilayer structure. The multilayer electroplating layer may be formed in a conformal film structure in which another electroplating layer is formed along a surface of any one electroplating layer or may be formed in a shape in which another electroplating layer is stacked only on one surface of any one electroplating layer. The seed layer may be formed by an electroless plating method or a vapor deposition method such as sputtering. The seed layer of the second coil pattern 312, the seed layer of the dummy lead patterns 341 and 342, and the seed layer of the vias 321, 322, and 323 may be formed integrally so that a boundary may not be formed therebetween, but is not limited thereto. The electroplating layer of the second coil pattern 312, the electroplating layer of the dummy lead patterns 341 and 342, and the electroplating layer of the vias 321, 322, and 323 may be integrally formed so that a boundary may not be formed therebetween, but is not limited thereto.

As another example, when the coil unit 300 is formed by separately forming the first coil pattern 311 and the lead patterns 331 and 332 disposed on the lower surface side of the support substrate 200 and the second coil pattern 312 and the dummy lead patterns 341 and 342 disposed on the upper surface side of the support substrate 200 and subsequently collectively stacking the first coil pattern 311 and the lead patterns 331 and 332 and the second coil pattern 312 and the dummy lead patterns 341 and 342 on the support substrate 200, the vias 321, 322, and 323 may include a high melting point metal layer and a low melting point metal layer having a melting point lower than that of the high melting point metal layer. Here, the low melting point metal layer may be formed of solder including lead (Pb) and/or tin (Sn). At least a part of the low melting point metal layer may be melted due to pressure and temperature at the time of collectively stacking to form, for example, an intermetallic compound (IMC) layer at a boundary between the low melting point metal layer and the second coil pattern 312.

As shown in FIGS. 7 and 8, as an example, the coil patterns 311 and 312, the lead patterns 331 and 332 and the dummy lead patterns 341 and 342 may be formed on and protrude from the lower surface and the upper surface of the support substrate 200, respectively. As another example, the first coil pattern 311 and the lead patterns 331 and 332 may protrude from the lower surface of the support substrate 200, and the second coil pattern 312 and the dummy lead patterns 341 and 342 may be embedded in the upper surface of the substrate 200 and upper surfaces of the second coil pattern 312 and the dummy lead patterns 341 and 342 may be exposed to the upper surface of the support substrate 200. In this case, a concave portion may be formed on the upper surface of the second coil pattern 312 and/or on the upper surfaces of the dummy lead patterns 341 and 342, so that the upper surface of the support substrate 200 and the upper surface of the second coil pattern 312 and/or the upper surfaces of the dummy lead patterns 341 and 342 may not be coplanar.

The coil patterns 311 and 312, the vias 321, 322, and 323, the lead patterns 331 and 332, and the dummy lead patterns 341 and 342 may each be formed of a conductive material such as copper (Cu), aluminum (Al), silver (Ag), tin (Sn), gold (Au), nickel (Ni), lead (Pb), titanium (Ti), chromium (Cr), or an alloy thereof, but is not limited thereto.

The ratio of a line width "a" of any one of the lead patterns 331 and 332 to a line width "b" of any one turn of the coil patterns 311 and 312 may satisfy a ratio of 1 to 1.5. For example, referring to FIGS. 7 and 9, a ratio of a line width "a" of the first lead pattern 331 to a line width "b" of any one turn of the first coil pattern 311 may satisfy 1 to 1.5. As another example, a line width of the second lead pattern 332 to the line width "b" of any one turn of the first coil pattern 311 may satisfy the ratio of 1 to 1.5. As another example, a line width of the first dummy lead pattern 341 to the line width "b" of any one turn of the first coil pattern 311 may satisfy the ratio of 1 to 1.5. As another example, a line width of the second dummy lead pattern 342 to the line width "b" of any one turn of the first coil pattern 311 may satisfy the ratio of 1 to 1.5. As another example, the line width "a" of the first lead pattern 331 to the line width of any one turn of the second coil pattern 312 may satisfy the ratio of 1 to 1.5. As another example, a line width of the second lead pattern 332 to the line width of any one turn of the second coil pattern 312 may satisfy the ratio of 1 to 1.5. As another example, a line width of the first dummy lead pattern 341 to the line width of any one turn of the second coil pattern 312 may satisfy the ratio of 1 to 1.5. As another example, a line width of the second dummy lead pattern 342 to the line width of any one turn of the second coil pattern 312 may satisfy the ratio of 1 to 1.5. Meanwhile, in the case of the present example embodiment, the ratio of the line width "a" of each of the first and second lead patterns 331 and 332 and the first and second dummy lead patterns 341 and 342 to the line width "b" of any one turn of the first coil pattern 311 satisfies 1 to 1.5 but the present inventive concept is not limited thereto.

Here, based on an optical microscope or SEM image for a length directional (L)-thickness directional (T) cross-section at a width-directional (W) central portion of the coil component 1000, the line width b of any one turn of the first coil pattern 311 may refer to a dimension of any one of a plurality of turns of the first coil pattern 311 illustrated in the image of the cross-section. Alternatively, the line width b of any one turn of the first coil pattern 311 may refer to an arithmetic mean value of length-directional (L) dimensions of each of a plurality of turns of the first coil pattern 311 illustrated in the cross-sectional image. Meanwhile, the above description may be equally applied to a method of calculating a line width of any one turn of the second coil pattern 311.

Here, based on an optical microscope or SEM image for a length directional (L)-thickness directional (T) cross-section at a width-directional (W) central portion of the coil component 1000, the line width of any one of the lead patterns 331 and 332 may refer to a maximum value of a length-directional (L) dimension of the first lead pattern 331 illustrated in the cross-sectional image. Alternatively, the line width of any one of the lead patterns 331 and 332 may refer to an arithmetic mean value of a length-directional (L) dimension of the first lead pattern 331 illustrated in the cross-sectional image. Alternatively, the line width of any one of the lead patterns 331 and 332 may refer to an arithmetic mean value of length-directional (L) dimensions of each of the first and second lead patterns 331 and 332 illustrated in the cross-sectional image. Meanwhile, the above description may be equally applied to a method of calculating the line width of each of the first and second dummy lead patterns 341 and 342.

In general, the line width of the lead pattern of the coil unit is formed to be twice or more times larger than the line width of any one turn of the coil pattern in order to prevent warpage or the like of a coil substrate on which the coil pattern is formed during a manufacturing process. In this case, an area of an effective area (area between the first and second lead patterns) in which the coil pattern may be formed is reduced based on the cross-sectional area of the same body of a single component in the length direction-width direction. That is, due to the decrease in the effective area, there is a limitation in increasing a total number of turns of the coil pattern and there is a limitation in increasing the cross-sectional area of the core disposed at the center of the coil pattern. In this example embodiment, the aforementioned problem may be solved by limiting the ratio of the line width of any one of the lead patterns 331 and 332 to the line width of any one turn of the coil patterns 311 and 312 to 1 to 1.5. That is, the cross-sectional area of the effective area in which the coil pattern may be formed may be increased by satisfying the above ratio. Accordingly, inductance characteristics may be improved by increasing the total number of turns of each of the coil patterns 311 and 312. In addition, the inductance characteristics may be improved by increasing a sectional area of the core 110 as much as the reduced line width of the lead patterns 331 and 332.

If the ratio of the line width of any one of the lead patterns 331 and 332 to the line width of any one turn of the coil patterns 311 and 312 is less than 1, it may be difficult to handle the coil substrate during a process and warpage may occur to increase a defect rate. If the ratio of the line width of any one of the lead patterns 331 and 332 to the line width of any one turn of the coil patterns 311 and 312 exceeds 1.5, the effect of increasing the sectional area of the effective area described above may be small.

The external electrodes 400 and 500 are disposed to be spaced apart from each other on the sixth surface 106 of the body and extend toward the first and second slit portions S1 and S2, respectively, so as to be in contact with the first and second lead patterns 331 and 332. In the present example embodiment, the external electrodes 400 and 500 include connection portions 410 and 510 disposed in the slit portions S1 and S2 and in contact with the lead patterns 331 and 332 exposed to the inner surfaces of the slit portions S1 and S2 and pad portions 420 and 520 disposed on the sixth surface 106 of the body 100. Specifically, the first external electrode 400 includes a first connection portion 410 disposed on the bottom surface and the inner wall of the first slit portion S1 and in contact with and connected to the first lead pattern 331 of the coil unit 300 and a first pad portion 420 disposed on the sixth surface 106 of the body 100. The second external electrode 500 includes a second connection portion 510 disposed on the bottom surface and the inner wall of the second slit portion S2 and in contact with and connected to the second lead pattern 332 of the coil unit 300 and a second pad portion 520 disposed on the sixth surface 106 of the body 100. The first pad portion 420 and the second pad portion 520 are disposed to be spaced apart from each other on the sixth surface 106 of the body 100.

The external electrodes 400 and 500 are formed on the bottom surfaces and inner walls of the slit portions S1 and S2 and the sixth surface 106 of the body 100, respectively. That is, the external electrodes 400 and 500 are formed in the form of conformal films on the inner surfaces of the slit portions S1 and S2 and the sixth surface 106 of the body 100. The connection portions 410 and 510 and the pad portions 420 and 520 of the external electrodes 400 and 500 are formed together in the same process and may be integrally formed on the inner surfaces of the slit portions S1 and S2 and the sixth surface 106 of the body 100. That is, a boundary may not be formed between the connection portions 410 and 510 and the pad portions 420 and 520.

The external electrodes 400 and 500 may be formed by a vapor deposition method such as sputtering and/or a plating method, but the method is not limited thereto.

The external electrodes 400 and 500 may be formed of a conductive material such as copper (Cu), aluminum (Al) silver (Ag), tin (Sn), gold (Au), nickel (Ni), lead (Pb), chromium (Cr), titanium (Ti), or an alloy thereof, but is not limited thereto. The external electrodes 400 and 500 may have a single layer or multi-layer structure. As an example, the external electrodes 400 and 500 are sequentially formed by plating on the pad portions 420 and 520 including copper (Cu) and may include first and second layers including nickel (Ni) and tin (Sn), respectively, but the structure is not limited thereto.

The connection portions 410 and 510 may be disposed at the central portion of the first and second slit portions S1 and S2 so as to be spaced apart from the third and fourth surfaces 103 and 104 of the body 100, respectively. That is, the connection portions 410 and 510 may be disposed at the central portions of the inner surfaces of the first and second slit portions S1 and S2 in the width direction W. Since the lead patterns 331 and 332 are exposed to the central portions of the inner surfaces of the first and second slit portions S1 and S2 in the width direction W, the connection portions 410 and 510 may be formed only in the regions of the inner surfaces of the first and second slit portions S1 and S2 in which the lead patterns 331 and 332 are exposed.

The pad portions 420 and 520 may be disposed on the sixth surface 106 of the body 100 and spaced apart from each of the third and fourth surfaces 103 and 104 of the body 100. In this case, it is possible to prevent the coil component 1000 according to the present example embodiment from being short-circuited with other components mounted on outside of a mounting board, or the like in the width direction W.

At least one of distances from each of the third and fourth surfaces 103 and 104 of the body 100 to the pad portions 420 and 520 may be smaller than at least one of distances from each of the third and fourth surfaces 103 and 104 of the body 100 to the connection portions 410 and 510. For example, a length d1 of the connection portions 410 and 510 in the width direction W may be shorter than a length d2 of the pad portions 420 and 520 in the width direction W. The sixth surface 106 of the body 100 is used as a mounting surface when the coil component 1000 according to this example embodiment is mounted on a mounting board, and the pad portions 420 and 520 of the external electrodes 400 and 500 may be connected to a connection pad of the mounting board through a bonding member such as solder. In this case, since the length d2 of the pad portions 420 and 520 in the width direction W is greater than the length d1 of the connection portions 410 and 510 in the width direction W, the area of the pad portions 420 and 520 in contact with the bonding member such as solder or the like may be increased to improve coupling force between the pad portions 420 and 520 and the mounting board. In addition, since the length d1 of the connection portions 410 and 510 in the width direction W is smaller than the length d2 of the pad portions 420 and 520 in the width direction W, a short-circuit with other components mounted adjacently in the length direction on the mounting board may be prevented. That is, a likelihood of a short-circuit with other components may be reduced by reducing the size (length d1 in the width direction W) of the connection portions 410 and 510 disposed to be most adjacent to other components at the time of mounting, among the components of the external electrodes 400 and 500.

The insulating film IF is disposed between the coil unit 300 and the body 100 and between the support substrate 200 and the body 100. The insulating film IF may be formed on the surfaces of the lead patterns 331 and 332, the coil patterns 311 and 312, the support substrate 200, and the dummy lead patterns 341 and 342, but is not limited thereto. The insulating film IF serves to insulate the coil unit 300 and the body 100 and may include a known insulating material such as parylene or the like, but is not limited thereto. As another example, the insulating film IF may include an insulating material such as an epoxy resin other than parylene. The insulating film IF may be formed by a vapor deposition method, but is not limited thereto. As another example, the insulating film IF may be formed by stacking and curing an insulating film for formation of the insulating film IF on both surfaces of the support substrate 200 on which the coil unit 300 is formed or may be formed by applying and curing an insulating paste for formation of the insulating film IF on both surfaces of the support substrate 200 on which the coil unit 300 is formed. Meanwhile, for the reasons described above, the insulating film IF is a component that may be omitted in this example embodiment. That is, if the body 100 has sufficient electrical resistance at a designed operating current and voltage of the coil component 1000 according to the present example embodiment, the insulating film IF may be omitted in this example embodiment.

Surface insulating layers 610, 620, and 630 are disposed on the body 100, and at least some of the surface insulating layers 610, 620, and 630 fills at least a portion of the slit portions S1 and S2. In the case of this example embodiment, the surface insulating layers 610, 620, and 630 include a first insulating layer 610 disposed on the first and second slit portions S1 and S2 to isolate the connection portions 410 and 510 from the third and fourth surfaces 103 and 104 of the body 100, respectively, a second insulating layer 620 disposed on the sixth surface 106 of the body 100 to expose the pad portions 420 and 520, and a third insulating layer 630 disposed on the first and second surfaces 101 and 102 of the body 100 and covering the connection portions 410 and 510.

The first insulating layer 610 is disposed in the first and second slit portions S1 and S2. An opening O exposing the connection portions 410 and 510 is formed in the first insulating layer 610. Specifically, referring to FIG. 4, the first insulating layer 610 is formed to fill the first and second slit portions S1 and S2 and is separated on the inner surface of each of the first and second slits S1 and S2 by the opening O. As for the first insulating layer 610 disposed in the first and second slit portions S1 and S2, a distance from a first surface of the first insulating layer 610 in contact with the inner walls of the first and second slit portions S1 and S2 to a second surface opposing the first surface of the first insulating layer 610 may correspond to a width of the first and second slit portions S1 and S2 (a distance in the length direction L from the first and second surfaces 101 and 102 of the body 100 to the inner wall of the first and second slit portions S1 and S2). As a result, the second surface of the first insulating layer 610 disposed on the slit portions S1 and S2 may be substantially coplanar with the first and second surfaces 101 and 102 of the body 100. Since the first insulating layer 610 is formed to fill the first and second slit portions S1 and S2 as a whole, an appearance defect of the coil component 1000 according to the present example embodiment may be reduced, compared with a case where the first insulating layer 610 is not formed in the first and second slit portions S1 and S2.

The second insulating layer 620 may be disposed on the sixth surface 106 of the body 100 and expose the pad portions 420 and 520. The second insulating layer 620 is disposed outside both ends of the pad portions 420 and 520 in the width direction W, so that the pad portions 420 and 520 may be spaced apart from the third and fourth surfaces 103 of the body 100, respectively. The second insulating layer 620 may prevent the coil component 1000 according to the present example embodiment from being short-circuited with other components mounted adjacent thereto in the width direction W. In addition, in mounting the coil component 1000 according to the present example embodiment, the second insulating layer 620 may prevent an increase in an effective mounting area occupied by the coil component 1000 according to the present example embodiment in the mounting board due to a bonding member such as solder or the like.

The first insulating layer 610 and the second insulating layer 620 may be integrally formed with each other. As an example, the first insulating layer 610 and the second insulating layer 620 may be formed together in the same process using the same insulating material, and thus, a boundary may not be formed therebetween. As an example, the first and second insulating layers 610 and 620 may be formed by a screen printing method using an insulating paste, an inkjet printing method, or the like, so as to be integrally formed. Meanwhile, in the case of this example embodiment, before forming the external electrodes 400 and 500, the first insulating layer 610 may be formed on the slit portions S1 and S2 and the second insulating layer 620 may be formed on the sixth surface 106 of the body 100. Accordingly, in selectively forming the external electrodes 400 and 500 on the sixth surface 106 of the body 100 and on the inner surfaces of the first and second slit portions S1 and S2, the first and second insulating layers 610 and 620 may serve as masks. As an example, the first and second insulating layers 610 and 620 may serve as a plating resist in forming the external electrodes 400 and 500 by a plating method.

The first and second insulating layers 610 and 620 may be collectively formed on each coil component at a coil bar level in a state before each coil component is individualized. That is, the process of forming the first and second insulating layers 610 may be performed between the aforementioned pre-dicing process and the individualization process (full dicing process).

The third insulating layer 630 is disposed on the first and second surfaces 101 and 102 of the body 100 and covers the connection portions 410 and 510. In this example embodiment, the third insulating layer 630 includes a cover layer 631 covering the first to fifth surfaces 101, 102, 103, 104, and 105 of the body 100 and a finishing layer 632 disposed on the first and second surfaces 101 and 102 to cover the connection portions 410 and 510.

The cover layer 631 is disposed on the first to fifth surfaces 101, 102, 103, 104, and 105 of the body 100 and extends on the inner surfaces of the slit portions S1 and S2 to cover the first insulating layer 610 disposed on the inner surfaces of S1 and S2. The cover layer 631 does not extend to the second insulating layer 620 disposed on the sixth surface 106 of the body 100. Meanwhile, the opening O may also extend to the cover layer 631 to expose the connection portions 410 and 510 externally. In this case, the cover layer 631 may serve as a mask, together with the first and second insulating layers 610 and 620, in selectively forming the external electrodes 400 and 500 on the body 100. Accordingly, the cover layer 631 may be formed in a process between a process of forming the first and second insulating layers 610 and 620 and a process of forming the external electrodes 400 and 500. The cover layer 631 is in contact with each of the first to fifth surfaces 101, 102, 103, 104, and 105 of the body 100 and is in contact with the other surface of the first insulating layer 610 on the inner walls of the slit portions S1 and S2. The process of forming the cover layer 631 may be performed after completing the process of individualizing the coil bar.

The finishing layer 632 is disposed on the first and second surfaces 101 and 102 of the body 100 to cover the cover layer 631 and the connection portions 410 and 510, respectively. In the present example embodiment, the first and second insulating layers 610 and 620 may be formed on the surface of the body 100 excluding regions in which the connection portions 410 and 510 and the pad portions 420 and 520 are to be formed and on the inner surfaces of the slit portions S1 and S2, a temporary member may be attached to the region in which the connection portions 410, 510 and the pad portions 510, 520 are to be formed, the cover layer 631 may be formed on the first to fifth surfaces 101, 102, 103, 104, and 105 of the body 100, the temporary member may be removed to expose the lead patterns 331 and 332 externally, and then the connection portions 410, 510 and the pad portions 510 and 520 may be formed in the area from which the temporary member was removed. Accordingly, the connection portions 410 and 510 are exposed externally without being covered by the cover layer 631. The finishing layer 632 is disposed on each of the first and second surfaces 101 and 102 of the body 100 to cover the connection portions 410 and 510 not covered by the cover layer 631.

Each of the insulating layers 610, 620, and 630 may include a thermoplastic resin such as polystyrene, vinyl acetate, polyester, polyethylene, polypropylene, polyamide, rubber, acrylic, and the like, a thermosetting resin such as phenol, epoxy, urethane, melamine, alkyd, and the like, a photosensitive resin, parylene, SiOx, or SiNx. Each of the insulating layers 610, 620, and 630 may further include an insulating filler such as an inorganic filler, but is not limited thereto.

Figure 10:
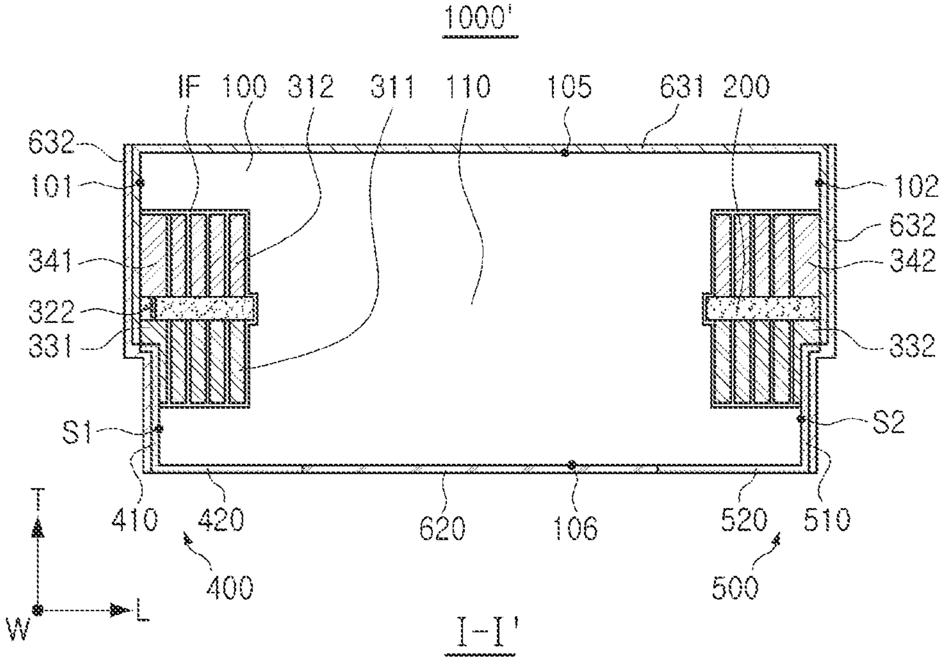
FIGS. 10 and 11 are views schematically illustrating modifications of a coil component according to an example embodiment of the present inventive concept, which correspond to FIG. 7.
Figure 11:
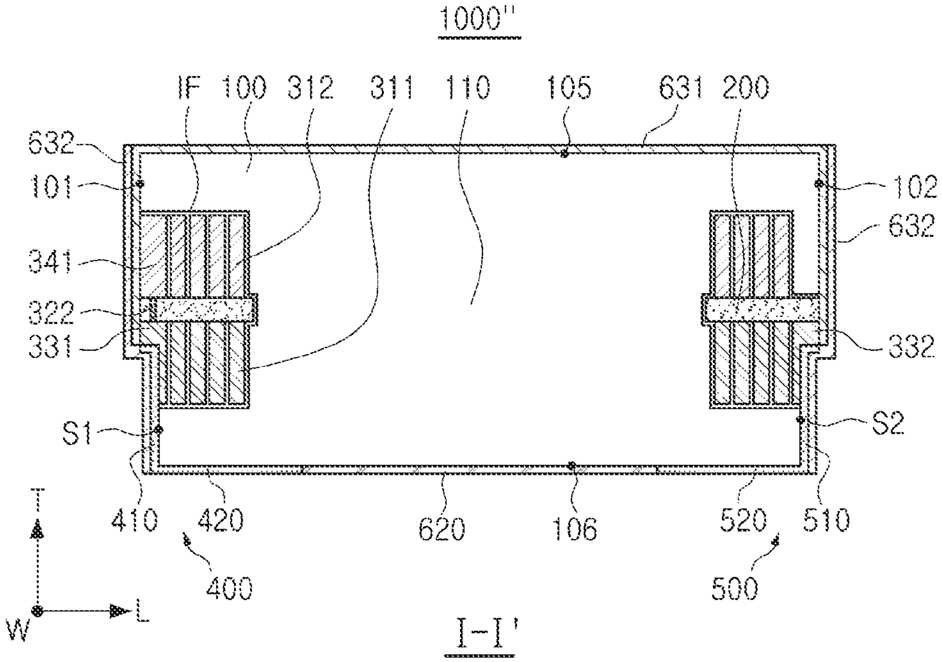

FIGS. 10 and 11 are views schematically illustrating modifications of a coil component according to an example embodiment of the present inventive concept, which correspond to FIG. 7.

Referring to FIG. 10, in the case of a modification of an example embodiment of the present inventive concept, the aforementioned third via 323 may be omitted. That is, referring to FIG. 9, the second dummy lead pattern 342 is irrelevant to an electrical connection between the coil unit 300 and the external electrodes 400 and 500, and thus, in this modification, the third via 323 for connection between the 332 and the second dummy lead pattern 342 is omitted. However, in the case of the present modification, since the second dummy lead pattern 342 is not omitted, warpage of the support substrate 200 during the process may be minimized.

Referring to FIG. 11, in the case of another modification of the example embodiment of the present inventive concept, the third via 323 may be omitted as in the modification shown in FIG. 10, and in addition, the second dummy lead pattern 342 may be omitted. In this modification, an effective volume of a magnetic material of the body 100 may be increased by a volume corresponding to a volume of the second dummy lead pattern 342.

Other Embodiment

Figure 12:
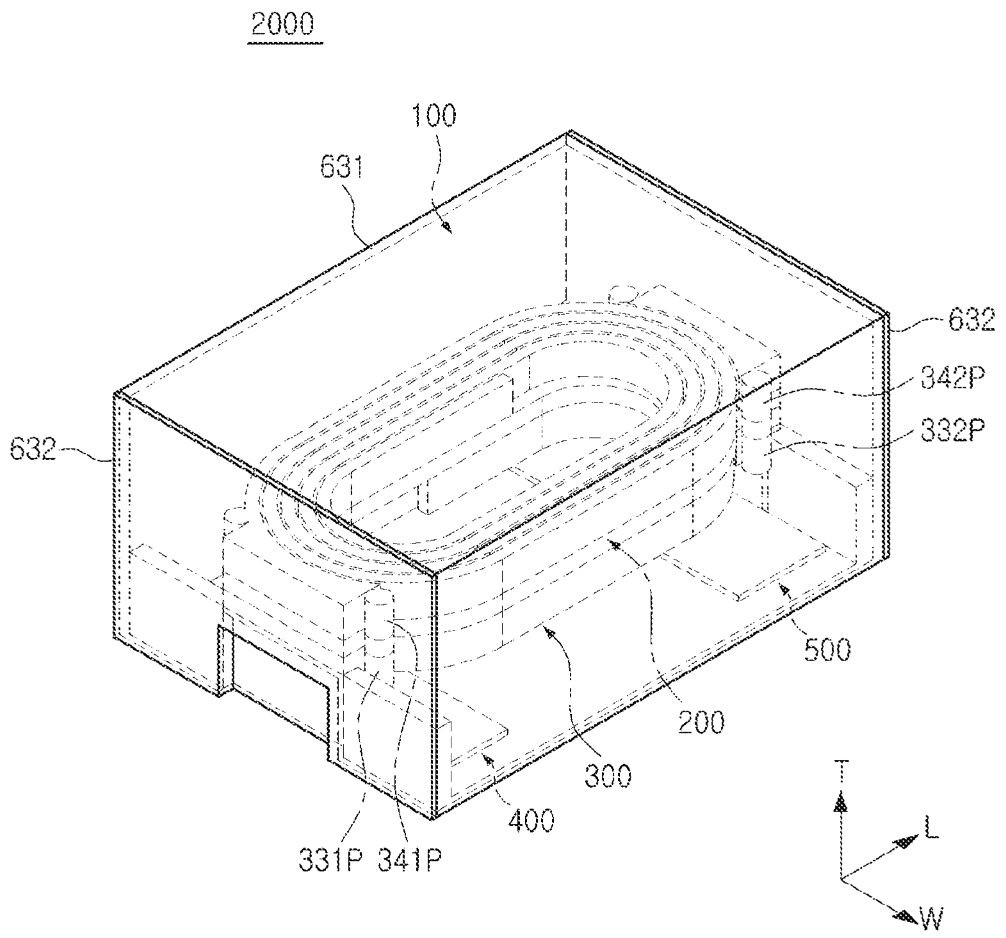
FIG. 12 is a view schematically illustrating a coil component according to another example embodiment of the present inventive concept.
Figure 13:
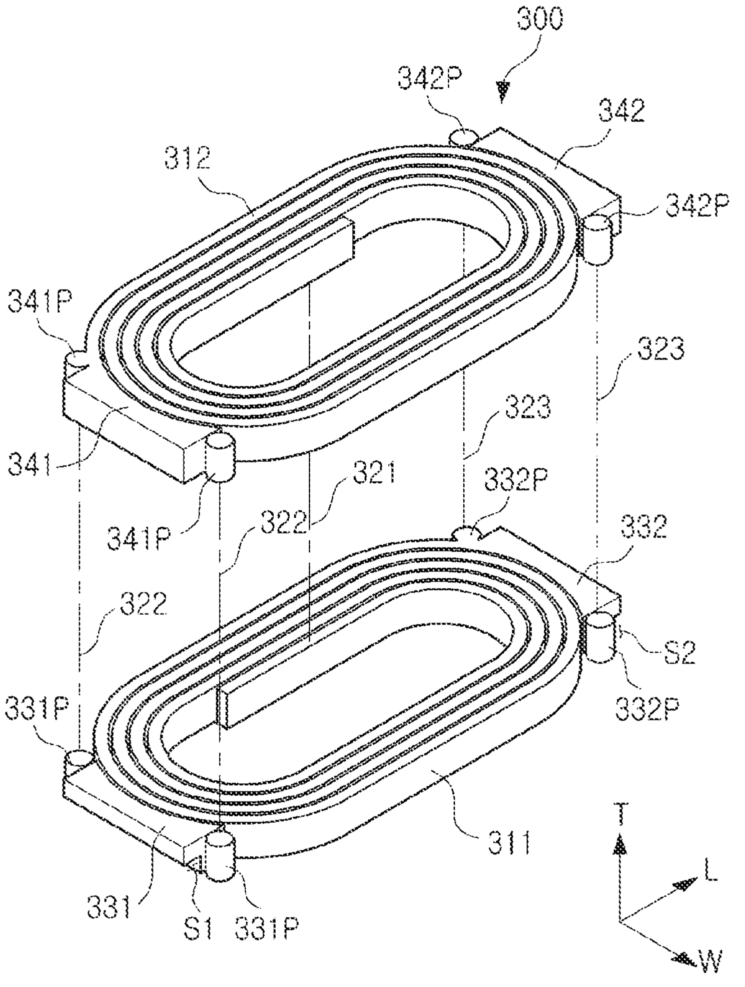
FIG. 13 is an exploded view of a coil unit of FIG. 12.

FIG. 12 is a view schematically illustrating a coil component according to another example embodiment of the present inventive concept. FIG. 13 is an exploded view of a coil unit of FIG. 12.

Referring to FIGS. 1 to 9 and FIGS. 12 and 13, a coil component 2000 according to another example embodiment of the present inventive concept includes lead patterns 331 and 332 and dummy lead patterns 341 and 342 which are different from those of the coil component 1000 according to an example embodiment of the present inventive concept. Thus, in describing the present example embodiment, only the lead patterns 331 and 332 and the dummy lead patterns 341 and 342 which are different from the exemplary example embodiment of the present inventive concept will be described. For the remainder of the components of this example embodiment, the description in the example embodiment of the present inventive concept may be applied as is. In addition, the modifications described in the example embodiment of the present inventive concept may be applied to the present example embodiment as is.

Comparing FIGS. 1 and 9 with FIGS. 12 and 13, each of the lead patterns 331 and 332 and the dummy lead patterns 341 and 342 applied to the coil component 2000 according to the present example embodiment includes via pads 331*p*, 332*p*, 341*p*, and 342*p*. The second via 322 is in contact with and connected to the via pad 331*p* of the first lead pattern 331 and the via pad 341*p* of the first dummy lead pattern 341 through the support substrate 200. The third via 323 is in contact with and connected to the via pad 332*p* of the second lead pattern 332 and the via pad 342*p* of the second dummy lead pattern 342 through the support substrate 200.

The via pads 331*p*, 332*p*, 341*p*, and 342*p* may be formed to protrude outwardly from the lead patterns 331 and 332 and the dummy lead patterns 341 and 342, respectively. That is, as an example, the via pad 331*p* of the first lead pattern 331 may be formed to protrude from the first lead pattern 331 in the width direction W, and the via pad 332*p* of the second lead pattern 332 may be formed to protrude from the second lead pattern 332 in the width direction W. The via pads 331*p*, 332*p*, 341*p*, and 342*p* may prevent deterioration of connection reliability between the lead patterns 331 and 332 and the dummy lead patterns 341 and 342 that occurs due to a reduction in the line width of the lead patterns 331 and 332 and the dummy lead patterns 341 and 342. That is, as an example, when the second via 322 is formed in an overlapped region between the first lead pattern 331 and the first dummy lead pattern 341, it may be difficult to form the second via 322 in the overlapped region due to the relatively reduced line width of the first lead pattern 331 and the first dummy lead pattern 341. In the present example embodiment, the lead patterns 331 and 332 and the dummy lead patterns 341 and 342 include the via pads 331*p*, 332*p*, 341*p*, and 342*p* formed to protrude outward from the lead patterns 331 and 332 and the dummy lead patterns 341 and 342, respectively, and thus, the lead patterns 331 and 332 and the dummy lead patterns 341 and 342 may be connected through the via pads 331*p*, 332*p*, 341*p*, and 342*p* disposed outside the lead patterns 331 and 332 and the dummy lead patterns 341 and 342 and the vias 322 and 323.

At least two of the via pads 331*p*, 332*p*, 341*p*, and 342*p* may be formed at each of the lead patterns 331 and 332 and the dummy lead patterns 341 and 342. That is, as an example, two via pads 331*p* of the first lead pattern 331 may be provided to protrude from one end of the first lead pattern 331 adjacent to the third surface 103 of the body 100 and the other end of the first lead pattern 331 adjacent to the fourth surface 104 of the body 100. The above description may also be applied to the first dummy lead pattern 341, and two second vias 322 may also be formed to correspond to the via pad 331*p* of the first lead pattern 331 and the via pad 341*p* of the first dummy lead pattern 341 to connect the first lead pattern 331 and the first dummy lead pattern 341.

Each of the via pads 331*p*, 332*p*, 341*p*, and 342*p* may have an overall circular cross-section, but the scope of the present inventive concept is not limited thereto. A diameter of at least one of the via pads 331*p*, 332*p*, 341*p*, and 342*p* may be larger than a line width of at least one of the lead patterns 331 and 332 and the dummy lead patterns 341 and 342. In this case, connection reliability between the lead patterns 331 and 332 and the dummy lead patterns 341 and 342 may be improved by the second and third vias 322 and 323.

According to the example embodiments of the present inventive concept, it is possible to improve the inductance characteristics of the coil component.

In addition, according to example embodiments of the present inventive concept, it is possible to easily form the lower electrode structure of the coil component.

While example embodiments have been illustrated and described above, it will be apparent to those skilled in the art that modifications and variations could be made without departing from the scope of the present inventive concept as defined by the appended claims.

What is claimed is:

1. A coil component comprising:

a body having a first surface, and a first end surface and a second end surface each connected to the first surface and opposing each other in a direction;

a support substrate disposed in the body;

a coil unit including a first coil pattern, a first lead pattern, and a second lead pattern respectively disposed on a first surface of the support substrate opposing the first surface of the body;

first and second slit portions respectively disposed in edge portions between each of the first end surface and the second end surface of the body and the first surface of the body, and exposing the first and second lead patterns; and first and second external electrodes arranged in the first and second slit portions and connected to the coil unit, wherein a ratio of a line width of any one of the first and second lead patterns, respectively extending from any one of the first and second end surfaces to the first coil pattern, to a line width of any one turn of the first coil pattern satisfies 1 to 1.5, and wherein at least one of the first or second slit portion extends into the body in said direction so that a respective one of the first or second lead pattern includes a reduced-thickness portion.

2. The coil component of claim 1, wherein the body further includes a first side surface and a second side surface connecting the first end surface and the second end surface and opposing each other, and the first and second external electrodes include connection portions disposed on the first and second slit portions, disposed in contact with the first and second lead patterns, and spaced apart from the first end surface and the second end surface of the body, respectively, and pad portions disposed on the first surface of the body and spaced apart from each other.

3. The coil component of claim 2, further comprising:

a first insulating layer disposed in the first and second slit portions to isolate the connection portions from the first side surface and the second side surface of the body, respectively;

a second insulating layer disposed on the first surface of the body and exposing the pad portions; and a third insulating layer disposed on the first end surface of the body and the second end surface of the body and covering the connection portions.

4. The coil component of claim 3, wherein the third insulating layer covers at least a portion of the first insulating layer disposed in the first and second slit portions.

5. The coil component of claim 2, wherein the pad portions are spaced apart from the first side surface and the second side surface of the body, respectively.

6. The coil component of claim 5, wherein at least one of a distance from each of the first side surface and the second side surface of the body to the pad portions is shorter than a distance from each of first side surface and the second side surface of the body to the connection portions.

7. The coil component of claim 1, wherein the coil unit includes:

a second coil pattern disposed on a second surface of the support substrate opposing the first surface of the support substrate; and a first via connecting inner ends of the respective first and second coil patterns through the support substrate, wherein the first lead pattern is disposed on the first surface of the support substrate and spaced apart from the first coil pattern, and the second lead pattern is disposed on the first surface of the support substrate and is in contact with the first coil pattern.

8. The coil component of claim 7, wherein the coil unit includes:

a first dummy lead pattern disposed on the second surface of the support substrate and in contact with the second coil pattern; and a second via connecting the first lead pattern and the first dummy lead pattern through the support substrate.

9. The coil component of claim 8, wherein each of the first lead pattern and the first dummy lead pattern includes a via pad disposed to protrude from each of the first lead pattern and the first dummy lead pattern and covers the second via;

a via pad protruding from at least one of the lead pattern and the dummy lead pattern.

10. The coil component of claim 8, wherein the coil unit further includes a second dummy lead pattern disposed to be spaced apart from the second coil pattern and the first dummy lead pattern on the second surface of the support substrate.

11. The coil component of claim 10, wherein the coil unit further includes a third via connecting the second lead pattern and the second dummy lead pattern through the support substrate.

12. The coil component of claim 11, wherein each of the second lead pattern and the second dummy lead pattern includes a via pad disposed to protrude from each of the second lead pattern and the second dummy lead pattern and covering the third via.

13. A coil component comprising:

a body;

a support substrate disposed in the body;

a coil unit including a first coil pattern and a first and second lead patterns arranged on a first surface of the support substrate opposing a first surface of the body and a first dummy lead pattern disposed on a second surface of the support substrate opposing the first surface of the support substrate;

first and second slit portions disposed in edge portions of the first surface of the body and exposing the first and second lead portions; and first and second external electrodes disposed to be spaced apart from each other on the first surface of the body and connected to the coil unit, wherein a ratio of a/b is 1 to 1.5 in which a is a line width of any one of the first lead pattern, the second lead pattern, and the first dummy lead pattern and b is a line width of any one turn of the first coil pattern, and each of the first lead pattern and the first dummy lead pattern includes a via pad protruding to outside of the first lead pattern and the first dummy lead pattern.

14. The coil component of claim 13, wherein the via pad of each of the first lead pattern and the first dummy lead pattern is provided in plurality, the plurality of via pads being spaced apart from each other, and wherein the coil component further comprises a plurality of vias penetrating the support substrate and corresponding to the plurality of via pads.

15. A coil component comprising:

a support substrate having a first surface and a second surface opposing the first surface;

a coil unit comprising a first coil pattern, a first lead pattern and a second lead pattern disposed on a first surface of the support substrate, and a first dummy lead pattern disposed on the second surface of the support substrate and opposing the first lead pattern;

a body encapsulating the support substrate and the coil unit, the body having:

a mounting surface parallel to the first surface of the support substrate, first and second end surfaces opposing each other and connecting the mounting surface, and first and second slit portions disposed respectively at edges formed by the first and second end surfaces with the mounting surface, the first and second slits extending away from the mounting surface through a portion of the first and second end surfaces and exposing at least a portion of the first and second lead patterns;

first and second external electrodes disposed respectively in the first and second slit portions, and contacting the first and second lead patterns, wherein each of the first dummy lead pattern and the first lead pattern includes a via pad protruding therefrom, an a via penetrating the support substrate and connecting the via pads.

16. The coil component of claim 15, wherein the first and second external electrodes respectively comprise:

first and second pad portions disposed on the mounting surface and spaced apart from each other, and first and second connection portions respectively connecting the portion of the first and second lead patterns exposed through the first and second slit portions to the first and second pad portions.

17. The coil component of claim 16, wherein the body further comprises first and second side surfaces opposing each other connecting the first and second end surface and the mounting surface, and wherein a distance between the first and second side surfaces and each of the first and connection portions is greater than a distance between the first and second side portions and each of the first and second pad portions.

18. The coil component of claim 15, wherein a ratio of a line width of any one of the first and second lead patterns to a line width of any one turn of the first coil pattern is in a range from 1 to 1.5.

19. The coil component of claim 15, wherein first and second lead patterns each have a first surface exposed to corresponding slit portions and having a higher surface roughness than other surfaces thereof.

20. The coil component of claim 15, further comprising a second coil pattern disposed on the second surface of the support substrate, and a first via penetrating the support substrate to connect the first coil pattern and the second coil pattern with each other.

* * * * *